US011527886B2

(12) United States Patent
Douglas et al.

(10) Patent No.: US 11,527,886 B2
(45) Date of Patent: Dec. 13, 2022

(54) ENHANCED OVER VOLTAGE PROTECTION OF A DOWNHOLE SYSTEM

(71) Applicant: Halliburton Energy Services, Inc., Houston, TX (US)

(72) Inventors: Hugh Douglas, Atascocita, TX (US); Joshua Ardianto, Houston, TX (US); Sudhir Kumar Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 183 days.

(21) Appl. No.: 16/507,203

(22) Filed: Jul. 10, 2019

(65) Prior Publication Data
US 2021/0013713 A1 Jan. 14, 2021

(51) Int. Cl.
*H02H 9/04* (2006.01)
*E21B 41/00* (2006.01)

(52) U.S. Cl.
CPC .............. *H02H 9/045* (2013.01); *E21B 41/00* (2013.01)

(58) Field of Classification Search
CPC ....... E21B 41/00; E21B 47/12; G01V 11/002; G05F 1/571; H02H 3/20; H02H 3/202; H02H 3/205; H02H 3/207; H02H 3/22; H02H 3/24; H02H 7/09; H02H 7/1252; H02H 9/00; H02H 9/04; H02H 9/045; H02H 9/046; H02M 7/48; H04L 25/02
See application file for complete search history.

(56) References Cited

U.S. PATENT DOCUMENTS 3,903,974 A * 9/1975 Cullen .................... E21B 36/02
175/17
6,522,119 B1 2/2003 Hernandez
(Continued)

FOREIGN PATENT DOCUMENTS

| JP | 07222350 A | * | 5/1999 | |
| KR | 20120033619 A | * | 4/2012 | |
| KR | 101412200 B1 | * | 6/2014 | ............. G06F 21/53 |

OTHER PUBLICATIONS

International Search Report and Written Opinion for Application No. PCT/US2019/041171, dated Apr. 9, 2020.

*Primary Examiner* — Jared Fureman
*Assistant Examiner* — Nicolas Bellido
(74) *Attorney, Agent, or Firm* — John Wustenberg; C. Tumey Law Group PLLC

(57) ABSTRACT

A power system a method for enhanced voltage protection. The system may comprise a surface high voltage power supply, a voltage controller connected to the surface high voltage power supply that sends commands to the surface high voltage power supply to control an output voltage of the surface high voltage power supply, one or more power cables attached to the surface high voltage power supply, a downhole tool connected to the one or more power cables at an end opposite of the surface high voltage power supply, and a dynamic clamp circuit connected to the surface high voltage power supply. A method may comprise creating a setpoint with a dynamic clamp circuit based at least in part on the command, activating the dynamic clamp circuit when the output voltage is higher than the setpoint, and absorbing excess energy from the high voltage power supply with the dynamic clamp circuit.

18 Claims, 7 Drawing Sheets

(56) References Cited

U.S. PATENT DOCUMENTS

| | | | |
|---|---|---|---|
| 7,987,901 B2* | 8/2011 | Krueger | E21B 29/005 |
| | | | 166/55 |
| 9,347,277 B2* | 5/2016 | Taherian | E21B 47/01 |
| 10,819,108 B2* | 10/2020 | Sonne | E21B 17/003 |
| 2002/0024783 A1 | 2/2002 | Underwood et al. | |
| 2009/0321070 A1 | 12/2009 | Hernandez-Marti | |
| 2010/0078161 A1* | 4/2010 | Krueger | E21B 29/005 |
| | | | 166/65.1 |
| 2015/0187531 A1 | 7/2015 | Birnbach | |
| 2018/0097466 A1* | 4/2018 | Huh | F04D 29/426 |
| 2019/0131871 A1* | 5/2019 | Krabbenborg | H02M 1/40 |
| 2019/0157861 A1* | 5/2019 | Sonne | H02H 9/045 |

* cited by examiner

ENHANCED OVER VOLTAGE PROTECTION OF A DOWNHOLE SYSTEM

BACKGROUND

Downhole operations may generally refer to drilling, logging, measuring, and/or surveying of oil or gas wells to determine their geological, petro-physical, or geophysical properties using electronic measuring instruments. The electronic instruments are conveyed into a wellbore with on a conveyance that may be a drill string and/or an armored wired cable, which may be referred to as a wireline cable. Measurements made by downhole instruments secured to the conveyance may be transmitted back to a data processing system located at the surface through electrical conductors in the conveyance. Electrical, acoustical, nuclear and imaging tools are used to stimulate the formations and fluids within the wellbore and the electronic measuring instruments then measure the response of the formations and fluids. The conveyance provides also the electrical power required by the logging tools to operate.

From an electric power perspective, a power system may be used to power downhole operations. In examples, the power system may be viewed as an electrical circuit. When a downhole tool draws current, a voltage is dropped across the cable thus reducing the downhole voltage. A voltage controller at the surface senses the current drawn and estimates the voltage drop across one or more power cables. It then sends a command to the surface high voltage power supplies that increases the surface voltage to compensate for the voltage drop across the one or more power cables. A problem occurs when the load is suddenly disconnected from the downhole tool. The surface power supplies will still be producing a much higher voltage, which may damage and/or destroy the downhole tool.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to systems and methods for downhole over voltage protection for downhole tools. In at least one embodiment, the system and methods may include a dynamic clamp circuit at the surface. The dynamic clamp circuit may be implemented on pre-existing power systems and/or newly developed power systems. A dynamic clamp circuit may reduce the downhole protection measures required, and thus reduce the cost of downhole protection as well as free up space on downhole tools.

Figure 1:
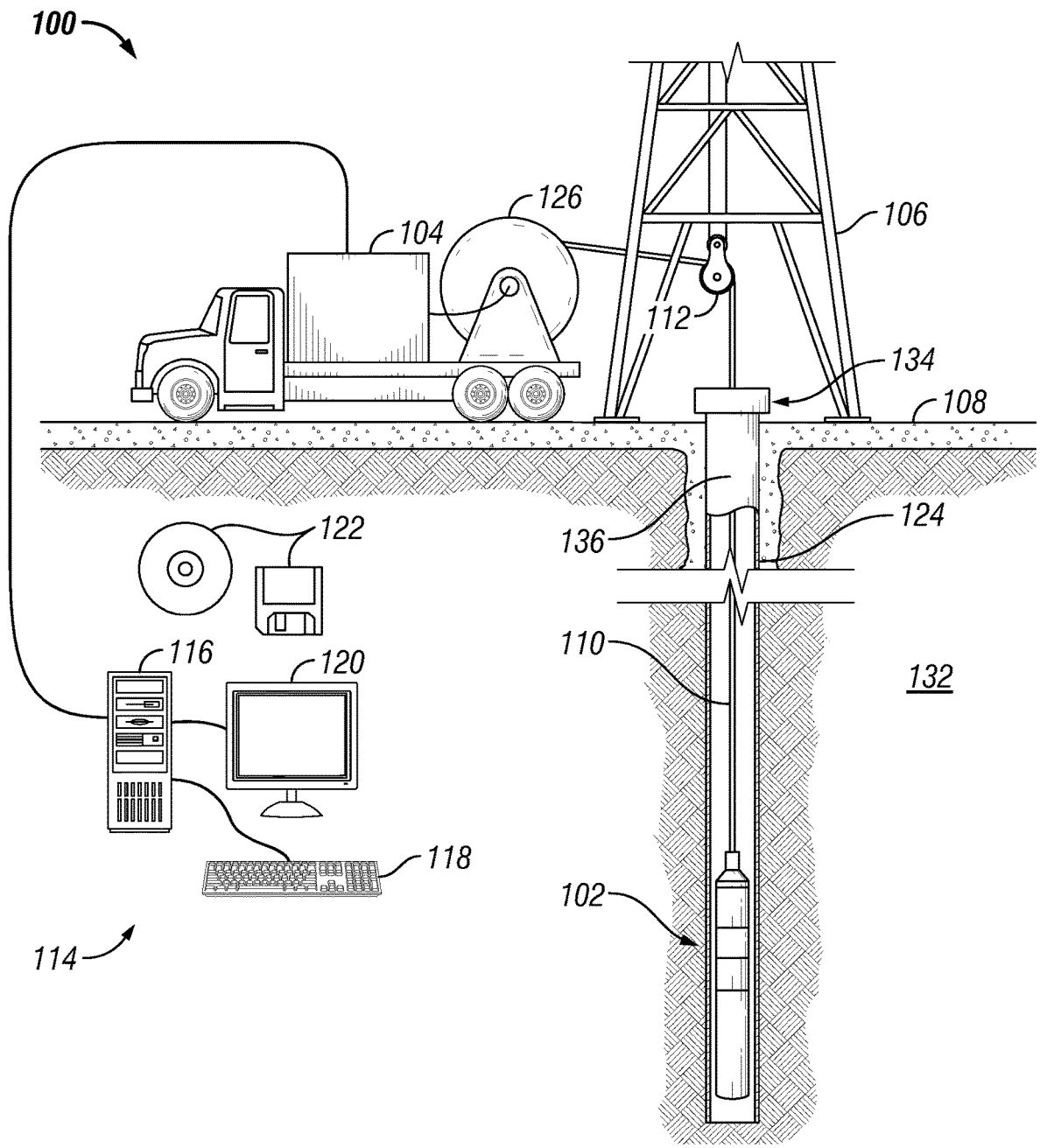
FIG. 1 illustrate an example of a downhole system.

FIG. 1 illustrates a cross-sectional view of a downhole system 100. As illustrated, downhole system 100 may comprise a downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as an input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, downhole tool 102 may be disposed in wellbore 124 by way of conveyance 110. Wellbore 124 may extend from a wellhead 134 into a formation 132 from surface 108. Generally, wellbore 124 may include horizontal, vertical, slanted, curved, and other types of wellbore geometries and orientations. Wellbore 124 may be cased or uncased. In examples, wellbore 124 may comprise a metallic material, such as tubular 136. By way of example, the tubular 136 may be a casing, liner, tubing, or other elongated steel tubular disposed in wellbore 124. As illustrated, wellbore 124 may extend through formation 132. Wellbore 124 may extend generally vertically into the formation 132. However, wellbore 124 may extend at an angle through formation 132, such as horizontal and slanted wellbores. For example, although wellbore 124 is illustrated as a vertical or low inclination angle well, high inclination angle or horizontal placement of the well and equipment may be possible. It should further be noted that while wellbore 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of wellbore 124. While not shown, a safety valve may control the hydraulic pressure that drives drum 126 on vehicle 104 which may reel up and/or release conveyance 110 which may move downhole tool 102 up and/or down wellbore 124. The safety valve may be adjusted to a pressure such that drum 126 may only impart a small amount of tension to conveyance 110 over and above the tension necessary to retrieve conveyance 110 and/or downhole tool 102 from wellbore 124. The safety valve is typically set a few hundred pounds above the amount of desired safe pull on conveyance 110 such that once that limit is exceeded; further pull on conveyance 110 may be prevented.

In examples, downhole tool 102 may operate with additional equipment (not illustrated) on surface 108 and/or disposed in a separate downhole system (not illustrated) to record measurements and/or values from formation 132. Downhole tool 102 may comprise any suitable device and any number of devices that may be used for logging operations. Without limitation, devices may be transmitters, receivers, electromagnetic device, sonic logging device, acoustic device, transducer, coils, antennas, samplers, and/or the like. Any device on downhole tool 102 may need power to function and perform operations within wellbore 124. Any device on downhole tool 102 may further be connected to information handling system 114, which may further control the operations of any device on downhole tool 102.

Figure 2:
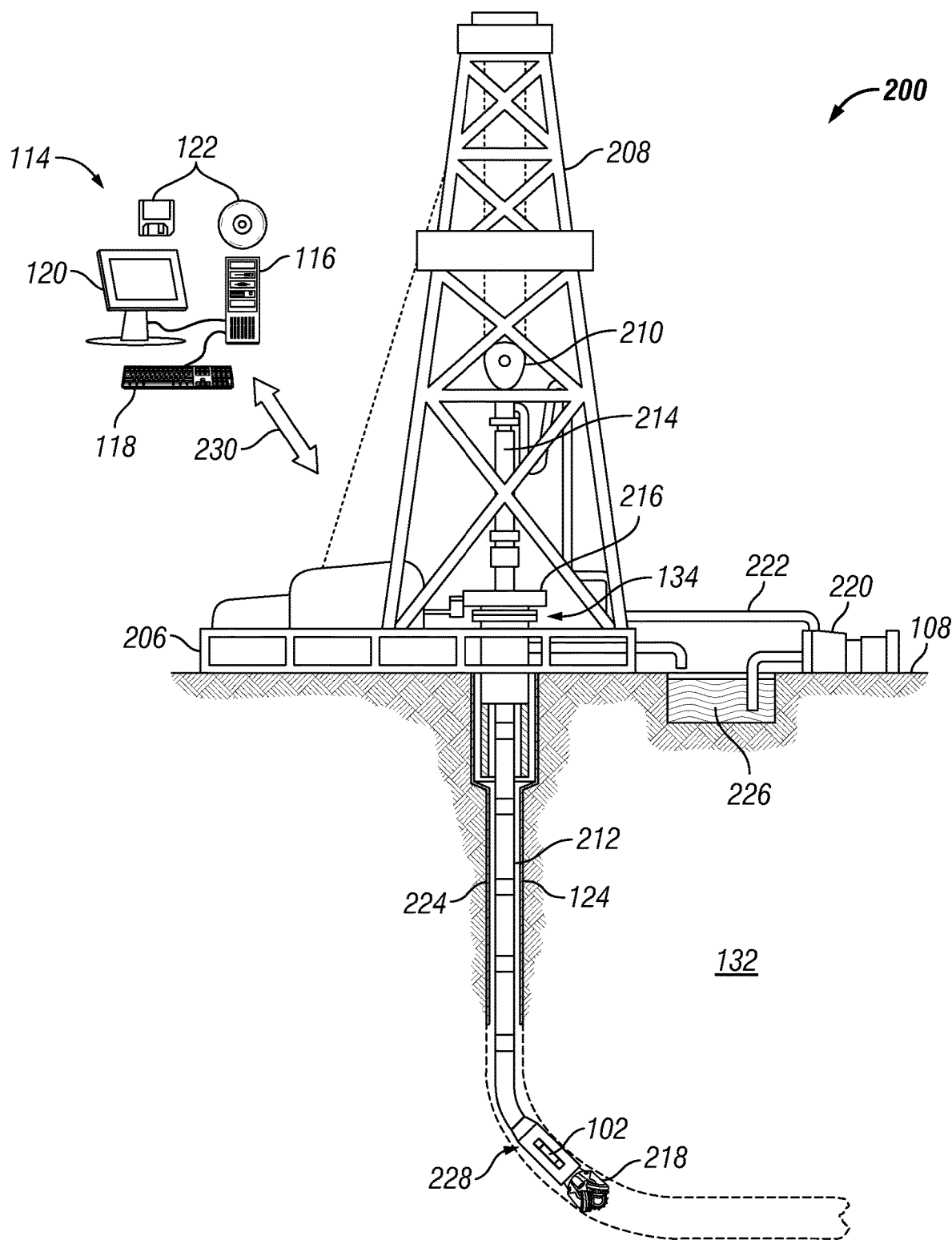
FIG. 2 illustrates an example of a drilling system.

FIG. 2 illustrates an example in which downhole tool 102 may be included in a drilling system 200. As illustrated, wellbore 124 may extend from wellhead 134 into formation 132 from surface 108. A drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend wellbore 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse wellbore 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise downhole tool 102. Downhole tool 102 may be disposed on the outside and/or within bottom hole assembly 228. As will be appreciated by those of ordinary skill in the art, bottom hole assembly 228 may be a measurement-while drilling (MWD) and/or logging-while-drilling (LWD) system. Without limitation, downhole tool 102 may include any number of suitable devices for logging or measuring while drilling, comprise a plurality of transmitters 128 and/or receivers 130. Without limitation, devices may be transmitters, receivers, electromagnetic device, sonic logging device, acoustic device, transducer, coils, antennas, samplers, and/or the like. Any device on downhole tool 102 may need power to function and perform operations within wellbore 124. Any device on downhole tool 102 may further be connected to information handling system 114, which may further control the operations of any device on downhole tool 102.

It should be noted that any device attached to bottom hole assembly 228 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive, as well as process, information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided which may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Figure 3:
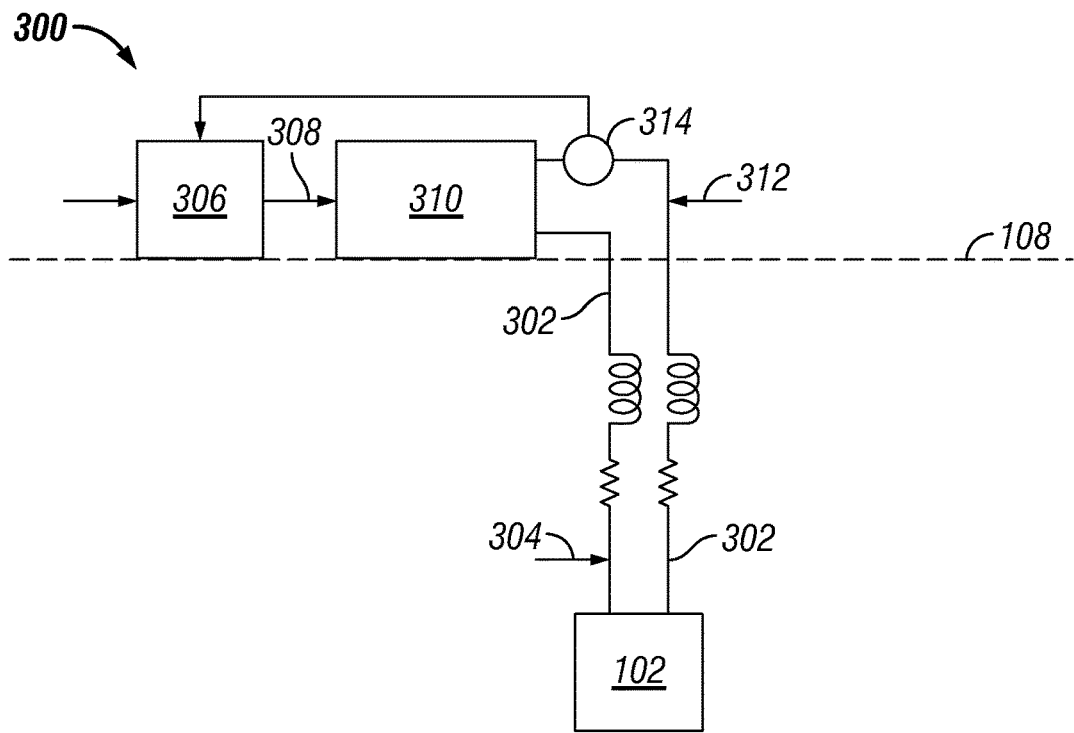
FIG. 3 illustrates an example of a power system.

As discussed above in FIGS. 1 and 2, any number of devices may be attached, connected to, and/or disposed on downhole tool 102. Each device may need power to function and/or operate. FIG. 3 illustrates a power system 300 that may be utilized to power downhole tool 102 during operations. As illustrated, one or more power cables 302 may be used to complete a power circuit and power downhole tool 102 and any devices connected to downhole tool 102. During operations, downhole voltage 304 that may power downhole tool 102 may be regulated by a voltage controller 306 at surface 108. In examples, and without limitation, the nominal downhole voltage 304 may be between about 200V DC to about 800 V DC, or about 600V DC. Without limitation, the voltage may be DC (Direct Current) or AC (Alternating Current). It should be noted, that when downhole tool 102 draws current, a voltage is dropped across one or more power cables 302, thus reducing downhole voltage 304. Voltage controller 306 at the surface may measure and/or sense the current drawn at node 314 and estimate the voltage drop across one or more power cables 302. Without limitation, node 314 may be a location along one or more power cables 302 in which voltage controller 306 may be attached. In examples, voltage controller 306 may be connected directly to one or more power cables 302 or may be attached to one or more power cables 302 through a secondary cable. It then sends a command signal 308 to surface high voltage power supplies 310 that increases surface voltage 312 to compensate for voltage drop across one or more power cables 302. This ensures that downhole voltage 304 seen by downhole tool 102 may be generally constant. While downhole tool 102 is connected, surface voltage 312 may be multiples of magnitude greater than downhole voltage 304. For example, surface voltage 312 may be as high as 1200V DC depending on the amount of current drawn.

During operations, problems may occur when the load, for example the use of power by one or more devices attached to downhole tool 102, is suddenly disconnected from power system 300. A sudden disconnect may be defined as an abrupt shutdown of downhole tool 102 during normal operations and/or a shutdown condition due to downhole protection activation. Surface high voltage power supplies 310 may still be producing a much higher voltage. Voltage controller 306 may sense at node 314 that current over one or more power cables 302 has dropped and may send a command signal 308 to reduce the output voltage from surface high voltage power supplies 310 so that downhole voltage 304 may drops to a nominal voltage. However, the output voltage from surface high voltage power supplies 310 may not drop immediately. During this time, energy stored in output capacitors (not illustrated) of surface high voltage power supplies 310 may discharge into any load (i.e., device consuming power on downhole tool 102) or capacitor bank (not illustrated) that may still be connected downhole to power cables 302. The result is that downhole voltage 304 may increase to levels that may cause catastrophic damage to downhole equipment.

Figure 4:
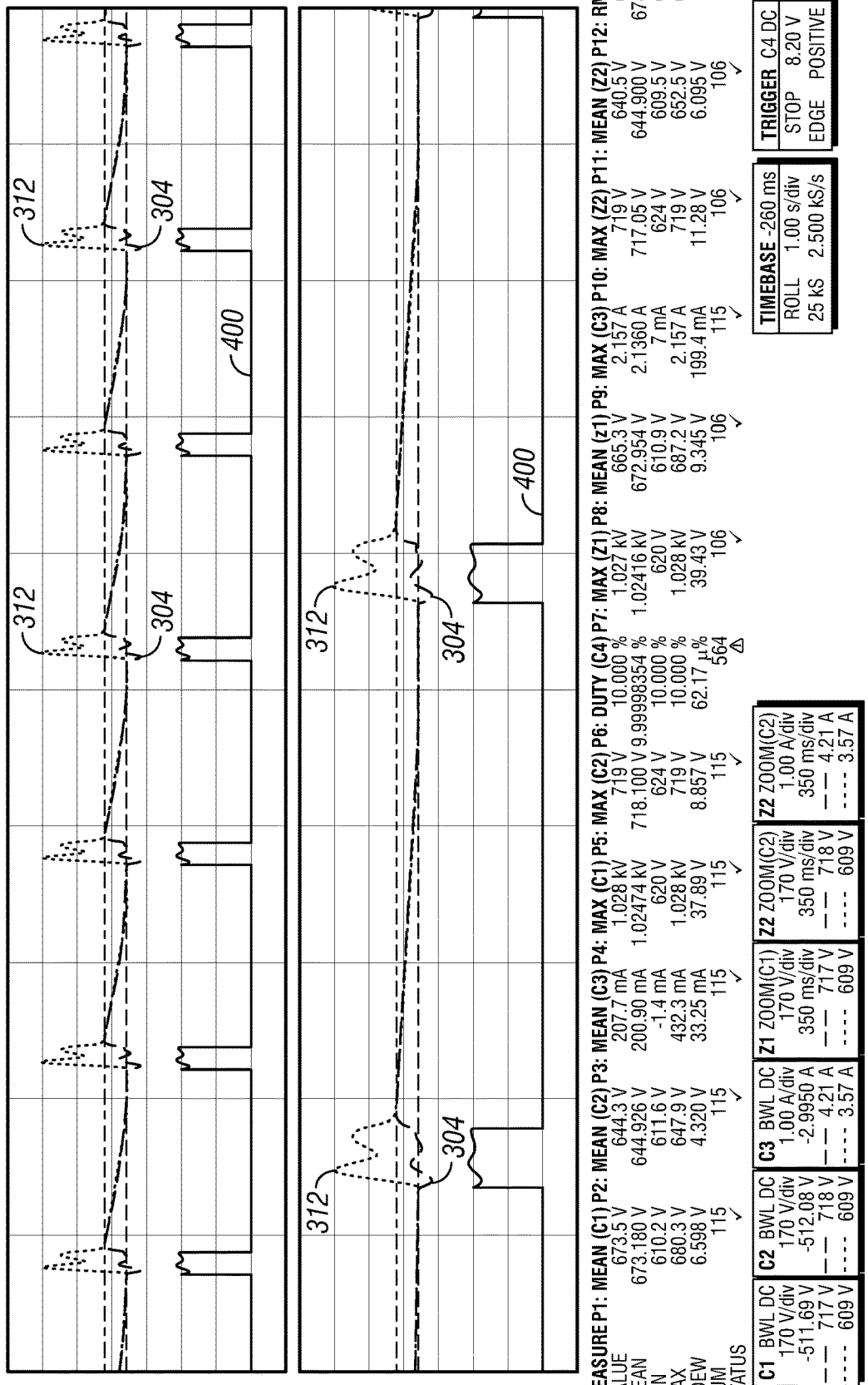
FIG. 4 is a graph of voltages in the power system on the surface and downhole.

FIG. 4 illustrates voltage fluctuations across one or more power cables 302 (e.g., referring to FIG. 3). It should be noted that a resistive load of 300 ohms with a parallel capacitance of 475 uF was used. As illustrated, the graph shows measured surface voltage 312, downhole voltage 304, and cable current 400. Initially, the load is disconnected and thus the cable current 400 is zero, surface voltage 312 is 600V, and downhole voltage 304 is 600V. Load (i.e., device consuming power on downhole tool 102) is then connected and surface voltage 312 increases to about 1000V. As illustrated, downhole voltage 304 stabilizes to about 600V. The load is then disconnected and surface voltage 312 may decrease slowly. At the same time downhole voltage 304 may increase from 600V to 719V and gradually drops to a voltage of about 600V. The increase in voltage may harm, break, and/or destroy a device on downhole tool 102 that may not be rated to operate at increased voltages.

Figure 5:
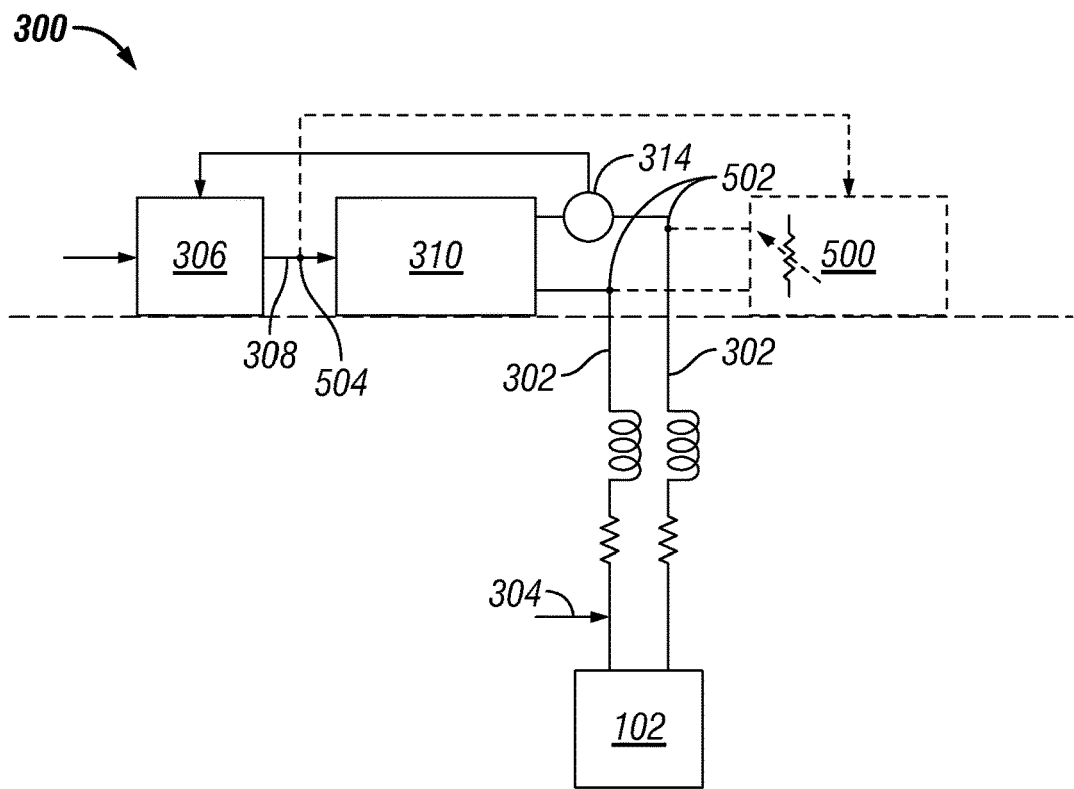
FIG. 5 illustrates an example of the power system with a dynamic clamp circuit.

FIG. 5 illustrates power system 300 with a dynamic clamp circuit 500, which may be attached at nodes 502 at the output of surface high voltage power supplies 310. Unlike standard clamp circuits where the clamp voltage is fixed, clamp voltage of dynamic clamp circuit 500 may be varied in real time. During operations, commands signal 308 from voltage controller 306 may be sensed at node 504 by dynamic clamp circuit 500. Clamp voltage may then set to be slightly above the voltage output of surface high voltage power supplies 310 as a setpoint, which may prevent dynamic clamp circuit 500 from interfering with normal operation. When the load is disconnected (i.e., device consuming power on downhole tool 102) and sensed by voltage controller 306 at node 314, dynamic clamp circuit 500 may drop the setpoint command below the output voltage of surface high voltage power supplies 310. Therefore, the clamp voltage should drop faster than the output voltage of surface high voltage power supplies 310. This may allow excess energy in power cables 302 from the output voltage of surface high voltage power supplies 310 to be consumed by dynamic clamp circuit 500. It should also be noted that excess energy may be stored in capacitors of surface high voltage power supplies 310. The excess energy stored in the capacitors may also be consumed by dynamic clamp circuit 500. Consumption of the excess energy by dynamic clamp circuit 500 may prevent downhole voltage 304 from rising as described above in FIG. 3. Dynamic clamp circuit 500 may lower supply output voltage from surface high voltage power supplies 310 until the output voltage meets voltage setting from command signal 308 by voltage controller 306. The clamp then should disengage because its setpoint is slightly above the power supply setpoint.

Figure 6:
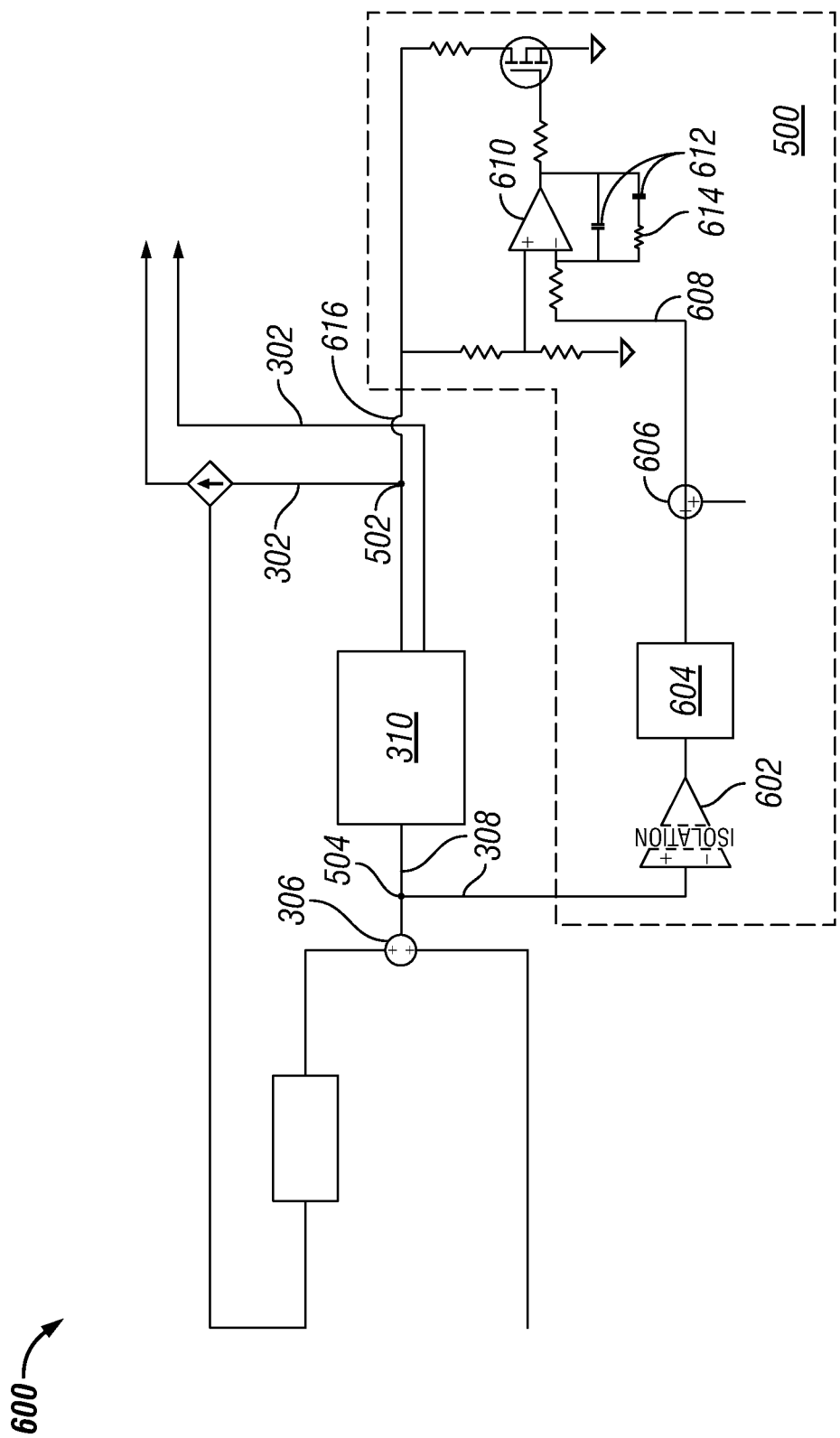
FIG. 6 is a circuit diagram of the dynamic clamp circuit.

FIG. 6 illustrates a circuit diagram 600 of dynamic clamp circuit 500. Circuit diagram 600 illustrates how dynamic clamp circuit 500 can be connected to surface high voltage power supplies 310, one or more power cables 302, and voltage controller 306. As illustrated, command signal 308 may be sensed at node 504 by dynamic clamp circuit 500. Command signal 308 may pass to an isolation amplifier 602 because the grounding of command signal 308 through surface high voltage power supplies 310 and dynamic clamp circuit 500 may not be referenced to the same ground, which may prevent signals from moving from dynamic clamp circuit 500 to surface high voltage power supplies 310 and voltage controller 306. At the output of isolation amplifier 602, command signal 308 may pass to a scaling function 604. The scaling function maps the voltage level of command signal 308 through isolation amplifier 602 to a level that is acceptable to control dynamic clamp circuit 500. The output from scaling function 604 may set clamp threshold 606 at a setpoint voltage 608. Setpoint voltage 608 may at least partially energize an amplifier 610 and effect any number of capacitors 612 and/or resistors 614 that may be connected to setpoint voltage 608 either in series or parallel. Output voltage 616 may be connected to dynamic clamp circuit 500 at node 502. Output voltage 616 may at least partially energize amplifier 610. During operations, output voltage 616 and setpoint voltage 608 may work together through amplifier 610 to activate dynamic clamp circuit 500. As described above, activation of dynamic clamp circuit 500 may allow for dynamic clamp circuit 500 to consume extra energy in power system 300 (e.g., referring to FIG. 5).

Figure 7:
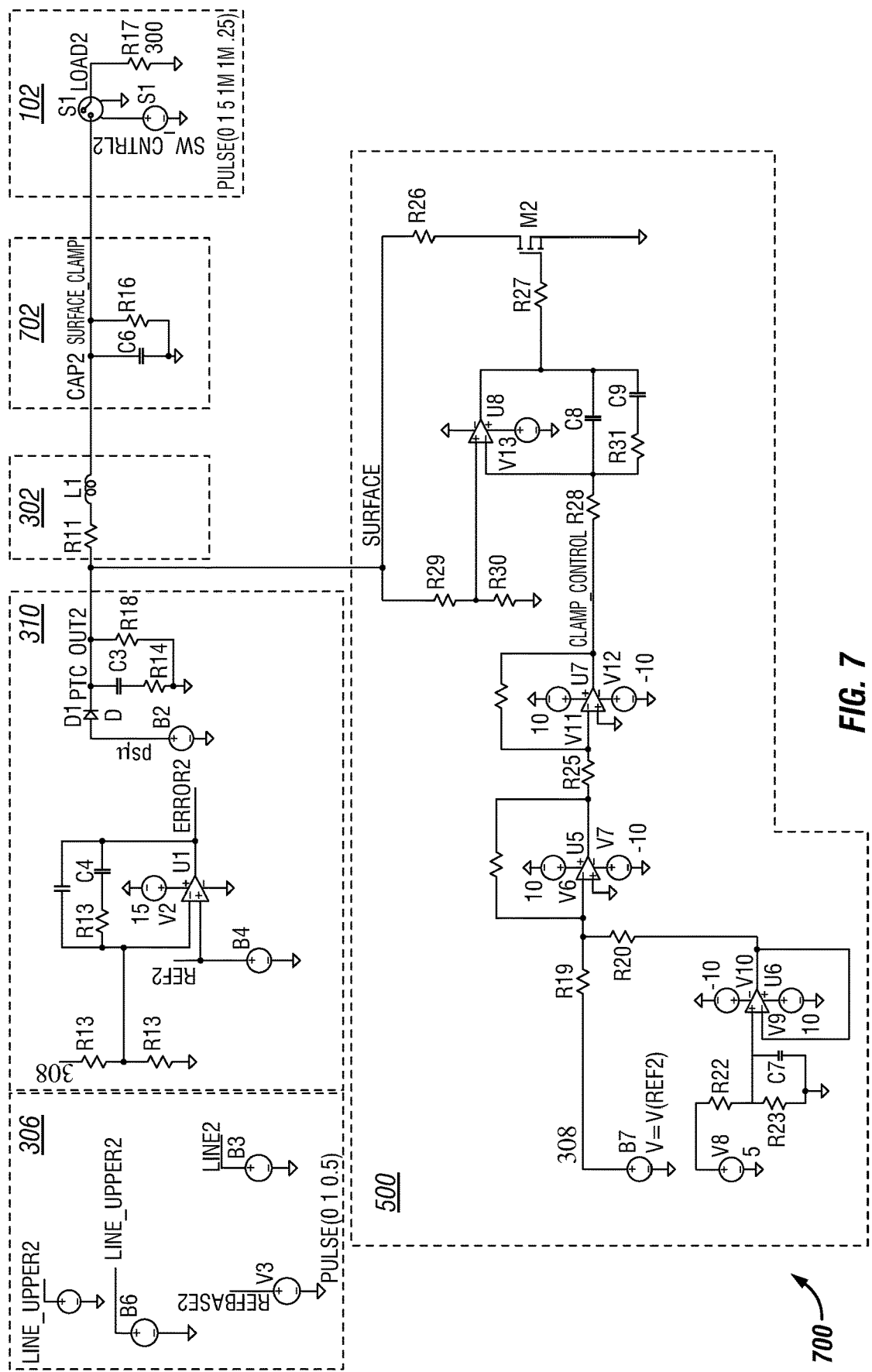
FIG. 7 is a circuit diagram of the power system.

FIG. 7 illustrates a circuit diagram 700 showing the circuit integration of dynamic clamp circuit 500 to surface high voltage power supplies 310, voltage controller 306, one or more power cables 302, downhole tool 102, and capacitor bank 702. As illustrated in FIG. 7, dynamic clamp circuit 500 is directly connected to the output of surface high voltage power supplies 310. The command signal 308 from surface high voltage power supply 310 is passed to the clamp board, which adds a small offset so that the clamp board does not engage during normal operation. When a load from downhole tool 102 drops out, command signal 308 from surface high voltage power supply 310 decreases faster than the output at surface high voltage power supply 310. During this time the clamp board engages and sinks all the excess energy internal to surface high voltage power supply 310. This prevents the energy from flowing downhole and causing over voltages at the receiving end of one or more power cables 302.

Figure 8A:
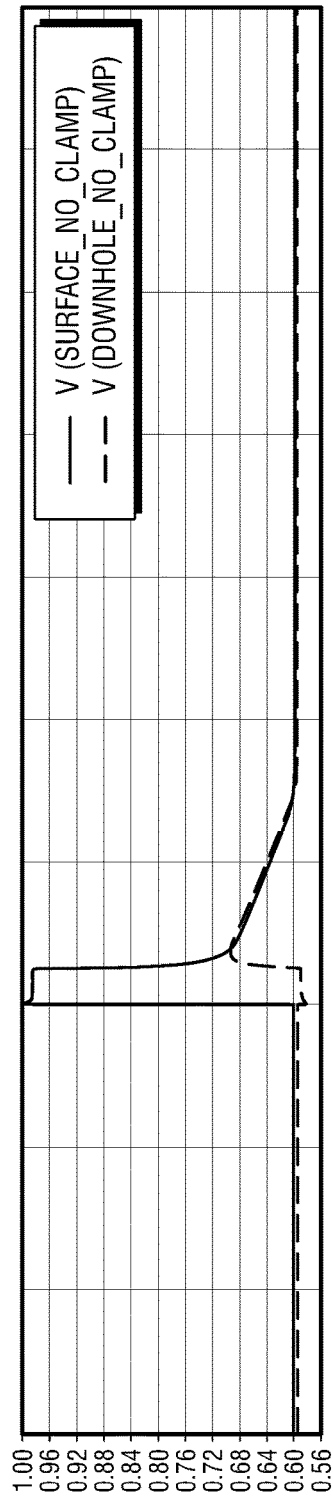
FIGS. 8A-8C are graphs of voltage readings with different setups of the power system.
Figure 8B:
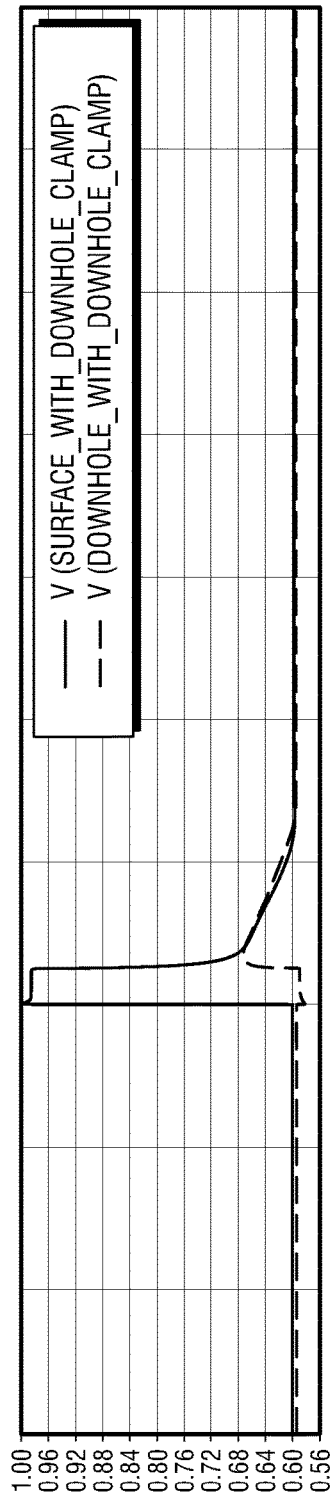
Figure 8C:
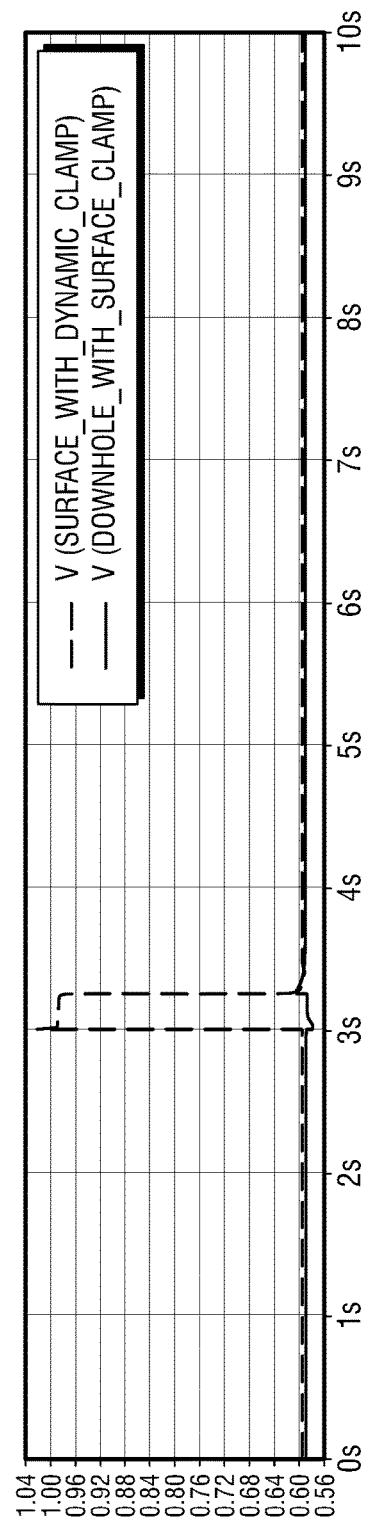

FIGS. 8A-8C illustrate voltage vs time graphs. FIG. 8A illustrates a voltage vs time graph without dynamic clamp circuit 500. FIG. 8B illustrates a voltage vs time graph with a dynamic clamp circuit 500 that is disposed downhole on downhole tool 102 (e.g., referring to FIGS. 1 and 2). FIG. 8C illustrates a voltage vs time graph with a dynamic clamp circuit 500 that is disposed at surface 108 (e.g., referring to FIG. 3). As illustrated in FIG. 8A, when no dynamic clamp circuit 500 is used, the downhole voltage could easily exceed 700V or any voltage that may be output by surface high voltage power supplies 310. In FIG. 8B, when a dynamic clamp circuit 500 is used downhole, dynamic clamp circuit 500 may be thermally limited and may be able to clamp the voltage to about 670V for a short duration of time. FIG. 8C illustrates the example in FIG. 3 where dynamic clamp circuit 500 is disposed on surface 108. In this example, dynamic clamp circuit 500 may only rises to about 610V and power system 300 may be able to sustain this condition indefinitely because it is not restricted to downhole environmental conditions.

Improvements over current techniques may allow for a power system to remove excess energy that would normally produce dangerous downhole over voltages. A dynamic clamp circuit may reduce over voltages faster than current power systems without a dynamic clamp circuit. Additionally, with the dynamic clamp circuit disposed on the surface, there may not be restrictions to the components being used, or the space required, which may make the dynamic clamp circuit easier to build and/or produce. Because the dynamic clamp circuit has been moved to the surface, it frees up space on the downhole tools that would otherwise be reserved for large clamp boards. Furthermore, systems and methods described above may reduce the need for oversized and very costly capacitor banks that would normally absorb the excess energy during sudden load changes. In examples, capacitor banks are comprised of over a hundred capacitors. The risk of a capacitor failure increases with the number of capacitors. By reducing the capacitance required, the risk of failure may be reduced, and reliability may be improved.

This method and system for a power system implementing a dynamic clamp circuit may include any of the various features of the compositions, methods, and system disclosed herein, including one or more of the following statements.

Statement 1. A power system may comprise a surface high voltage power supply, a voltage controller connected to the surface high voltage power supply that sends commands to the surface high voltage power supply to control an output voltage of the surface high voltage power supply, one or more power cables attached to the surface high voltage power supply, a downhole tool connected to the one or more power cables at an end opposite of the surface high voltage power supply, and a dynamic clamp circuit connected to the surface high voltage power supply.

Statement 2. The power system of statement 1, wherein the voltage controller is configured to sense the output voltage of the surface high voltage power supply.

Statement 3. The power system of statements 1 or 2, wherein the dynamic clamp circuit is connected to the voltage controller.

Statement 4. The power system of statement 3, wherein the dynamic clamp circuit is configured to create a setpoint above the output voltage.

Statement 5. The power system of statement 4, wherein the dynamic clamp circuit is configured to alter the setpoint based at least in part on the output voltage.

Statement 6. The power system of statements 1-3, wherein the dynamic clamp circuit is configured to absorb excess energy from surface high voltage power supply.

Statement 7. The power system of statements 1-3 or 6, wherein the one or more power cables are placed in a wireline.

Statement 8. The power system of statements 1-3, 6, or 7, wherein the one or more power cables are placed in a drill string.

Statement 9. The power system of statements 1-3, or 6-8, wherein the dynamic clamp circuit is further connected to the one or more power cables.

Statement 10. The power system of statements 1-3 or 6-9, wherein the voltage controller is configured to alter the commands to the surface high voltage power supply based at least in part on the output voltage.

Statement 11. A method for controlling voltage in a power system may comprise sending a command from a voltage controller to a high voltage power supply, producing a voltage output from the high voltage power supply based at least in part on the command, distributing the voltage output from the high voltage power supply to a downhole tool with one or more power cables, creating a setpoint with a dynamic clamp circuit based at least in part on the command, activating the dynamic clamp circuit when the output voltage is higher than the setpoint, and absorbing excess energy from the high voltage power supply with the dynamic clamp circuit.

Statement 12. The method of statement 11, further comprising sensing the output voltage with the voltage controller.

Statement 13. The method of statement 12, further comprising adjusting the command based at least in part on the voltage output with the voltage controller.

Statement 14. The method of statements 11 or 12, wherein the dynamic clamp circuit is connected to the voltage controller.

Statement 15. The method of statement 14, further comprising adjusting the setpoint with the dynamic clamp circuit based at least in part on the command.

Statement 16. The method of statements 11, 12, or 14, wherein the dynamic clamp circuit is connected to the voltage controller, the one or more power cables, and the high voltage power supply.

Statement 17. The method of statements 11, 12, 14 or 16, wherein the one or more power cables are placed in a wireline.

Statement 18. The method of statements 11, 12, 14, 16, or 17, wherein the one or more power cables are placed in a drill string.

Statement 19. The method of statements 11, 12, 14, or 16-18, further comprising connecting the dynamic clamp circuit to a power system.

Statement 20. The method of statements 11, 12, 14, or 16-19, wherein the dynamic clamp circuit is deployed on surface.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A power system comprising:
   a surface high voltage power supply;
   a voltage controller connected to the surface high voltage power supply that sends commands to the surface high voltage power supply to regulate an output voltage of the surface high voltage power supply;
   one or more power cables attached to the surface high voltage power supply;
   a downhole tool connected to the one or more power cables at an end opposite of the surface high voltage power supply; and
   a dynamic clamp circuit disposed on the surface and configured to sense the commands from the voltage controller and connected to the surface high voltage power supply and configured to absorb excess energy from the surface high voltage power supply when a load from the downhole tool reduces.

2. The power system of claim 1, wherein the voltage controller is configured to sense the output current of the surface high voltage power supply.

3. The power system of claim 1, wherein the dynamic clamp circuit is connected to the voltage controller.

4. The power system of claim 3, wherein the dynamic clamp circuit is configured to create a setpoint above the output voltage.

5. The power system of claim 4, wherein the dynamic clamp circuit is configured to alter the setpoint based at least in part on the output voltage.

6. The power system of claim 1, wherein the one or more power cables are placed in a wireline.

7. The power system of claim 1, wherein the one or more power cables are placed in a drill string.

8. The power system of claim 1, wherein the dynamic clamp circuit is further connected to the one or more power cables.

9. The power system of claim 1, wherein the voltage controller is configured to alter the commands to the surface high voltage power supply based at least in part on the output voltage.

10. A method for controlling voltage in a power system comprising:
    sending a command from a voltage controller to a high voltage power supply;
    producing a voltage output from the high voltage power supply based at least in part on the command;
    distributing a voltage output from the high voltage power supply to a downhole tool with one or more power cables;
    creating a setpoint with a dynamic clamp circuit based at least in part on the command, wherein the dynamic clamp circuit is disposed on the surface and configured to sense the commands from the voltage controller;
    activating the dynamic clamp circuit when the output voltage is higher than the setpoint; and
    absorbing excess energy from the high voltage power supply with the dynamic clamp circuit when a load from the downhole tool reduces.

11. The method of claim 10, further comprising sensing the current output with the voltage controller.

12. The method of claim 11, further comprising adjusting the command based at least in part on the voltage output with the voltage controller.

13. The method of claim 10, wherein the dynamic clamp circuit is connected to the voltage controller.

14. The method of claim 13, further comprising adjusting the setpoint with the dynamic clamp circuit based at least in part on the command.

15. The method of claim 10, wherein the dynamic clamp circuit is connected to the voltage controller, the one or more power cables, and the high voltage power supply.

16. The method of claim 10, wherein the one or more power cables are placed in a wireline.

17. The method of claim 10, wherein the one or more power cables are placed in a drill string.

18. The method of claim 10, further comprising connecting the dynamic clamp circuit to a power system.

* * * * *